US012633585B2

(12) United States Patent
Han et al.

(10) Patent No.: US 12,633,585 B2
(45) Date of Patent: May 19, 2026

(54) BATTERY PACK INCLUDING A BATTERY MODULE

(71) Applicant: SK On Co., Ltd., Seoul (KR)

(72) Inventors: Jin Su Han, Daejeon (KR); Min Song Kang, Daejeon (KR); Bon Seok Ku, Daejeon (KR); Jun Hee Jung, Daejeon (KR); Sei Hoon Cho, Daejeon (KR); Jae Il Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 836 days.

(21) Appl. No.: 17/869,260

(22) Filed: Jul. 20, 2022

(65) Prior Publication Data

US 2023/0026536 A1     Jan. 26, 2023

(30) Foreign Application Priority Data

Jul. 22, 2021     (KR) ......................... 10-2021-0096328

(51) Int. Cl.
| | |
|---|---|
| *H01M 10/48* | (2006.01) |
| *H01M 10/613* | (2014.01) |
| *H01M 10/653* | (2014.01) |
| *H01M 10/6552* | (2014.01) |
| *H01M 50/262* | (2021.01) |
| *H01M 50/287* | (2021.01) |

(52) U.S. Cl.
CPC ....... *H01M 10/482* (2013.01); *H01M 10/613* (2015.04); *H01M 10/653* (2015.04); *H01M 10/6552* (2015.04); *H01M 50/262* (2021.01); *H01M 50/287* (2021.01)

(58) Field of Classification Search
CPC ............. H01M 10/482; H01M 10/613; H01M 10/653; H01M 10/6552; H01M 50/262; H01M 50/287
See application file for complete search history.

(56) References Cited

U.S. PATENT DOCUMENTS

| | | |
|---|---|---|
| 9,136,513 B2 | 9/2015 | Kim |
| 10,069,178 B2 | 9/2018 | Moon et al. |
| 10,361,463 B2 | 7/2019 | Lee et al. |
| 10,644,276 B2 | 5/2020 | Choi et al. |
| (Continued) | | |

FOREIGN PATENT DOCUMENTS

| | | | |
|---|---|---|---|
| CN | 106025132 B | 7/2019 | |
| EP | 3082175 A1 * | 10/2016 | ........ H01M 10/0585 |
| (Continued) | | | |

OTHER PUBLICATIONS

KR 101146492 English Translation (Year: 2012).*

(Continued)

*Primary Examiner* — Jimmy Vo
(74) *Attorney, Agent, or Firm* — The Webb Law Firm

(57) ABSTRACT

Provided are a battery module and a battery pack including the same, and more particularly, a battery module in which a CMU (cell monitoring unit) may be easily and conveniently mounted by providing a CMU mounting part, on which the CMU may be mounted, on an end plate constituting a module case, and a battery pack capable of simplifying the entire manufacturing process of the battery pack and increasing space utilization inside the battery pack by applying the battery module to the battery pack.

13 Claims, 20 Drawing Sheets

(56)     References Cited

U.S. PATENT DOCUMENTS

| | | | |
|---|---|---|---|
| 2013/0189549 A1 | 7/2013 | Nemoto | |
| 2014/0014428 A1 * | 1/2014 | Yanagi ..................... | B60K 1/04 |
| | | | 180/68.5 |
| 2016/0308180 A1 * | 10/2016 | Kohda ................... | B60L 50/66 |
| 2017/0125752 A1 | 5/2017 | Kim et al. | |
| 2018/0138564 A1 * | 5/2018 | Kim ................... | H01M 10/613 |
| 2020/0058918 A1 | 2/2020 | Shin et al. | |
| 2020/0373542 A1 * | 11/2020 | Zhang ................. | H01M 50/545 |
| 2021/0344074 A1 | 11/2021 | Jung et al. | |

FOREIGN PATENT DOCUMENTS

| | | | | |
|---|---|---|---|---|
| JP | 6160898 B2 * | 7/2017 | .......... | H01M 10/425 |
| KR | 101146492 B1 * | 5/2012 | .......... | H01M 10/425 |
| KR | 20130110943 A * | 10/2013 | | |
| KR | 20140130357 A * | 11/2014 | | |
| KR | 20150128176 A * | 11/2015 | | |
| KR | 101717199 B1 | 3/2017 | | |
| KR | 101953362 B1 | 5/2019 | | |
| KR | 102017237 B1 | 9/2019 | | |
| KR | 102034206 B1 | 10/2019 | | |
| KR | 102117646 B1 | 6/2020 | | |
| KR | 1020200104143 A | 9/2020 | | |
| KR | 1020200112934 A | 10/2020 | | |
| KR | 102233501 B1 * | 3/2021 | | |
| WO | 2016166496 A1 | 10/2016 | | |
| WO | 2021125476 A1 | 6/2021 | | |

OTHER PUBLICATIONS

KR 20130110943 English Translation (Year: 2013).*
KR 20140130357 English Translation (Year: 2014).*
KR 102233501 English Translation (Year: 2021).*
KR 20150128176 English Translation (Year: 2015).*

* cited by examiner

【FIG. 1】
【PRIOR ART】
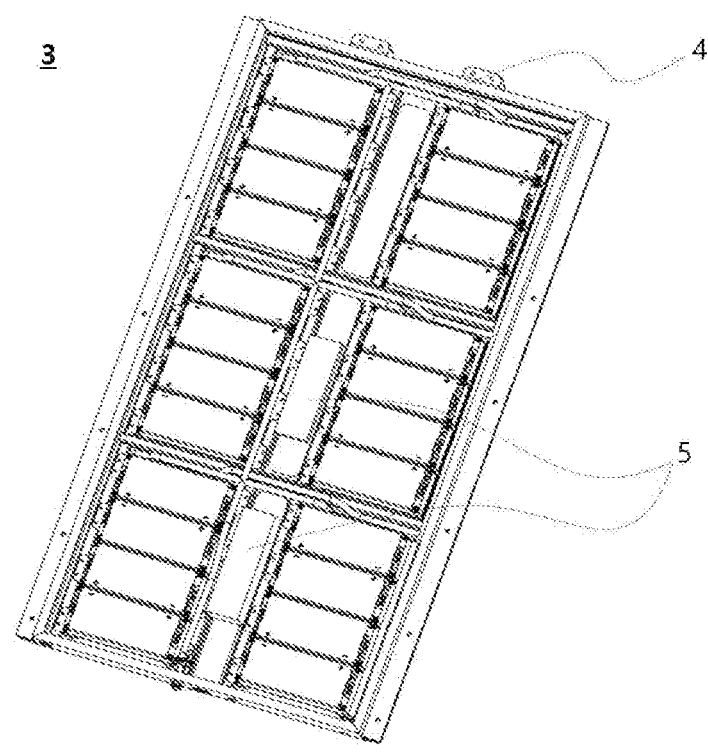

【FIG. 2】
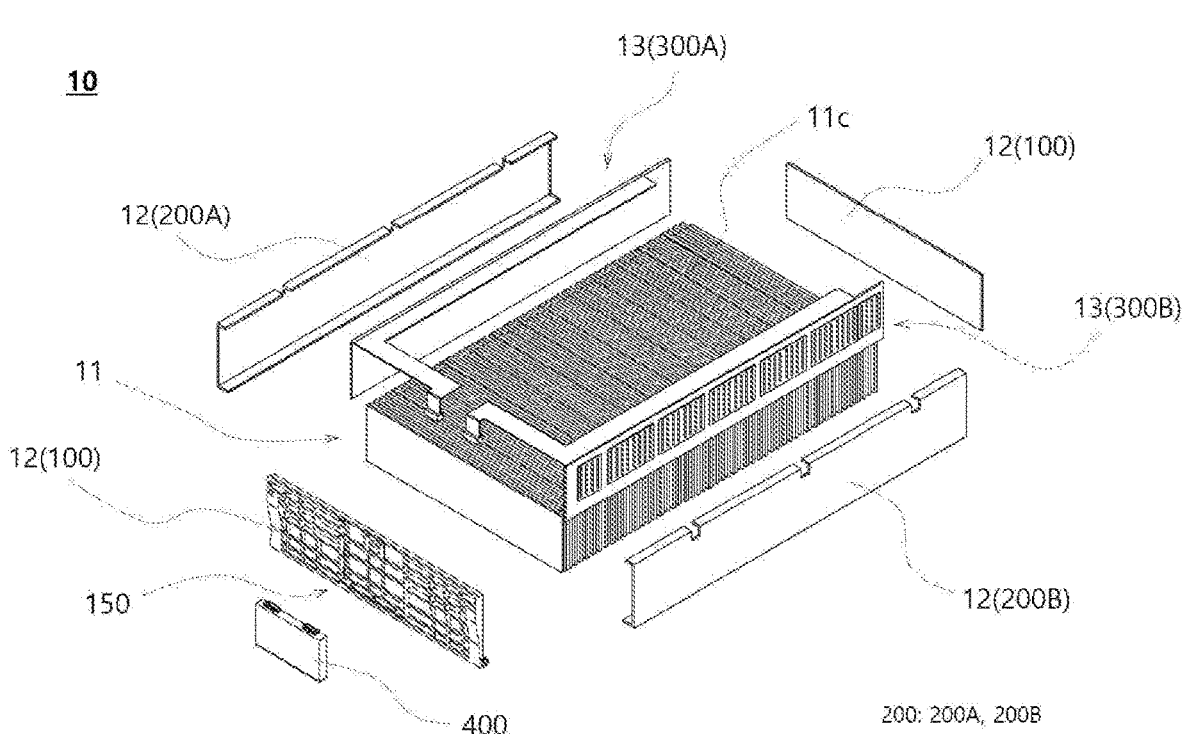

【FIG. 3】
10
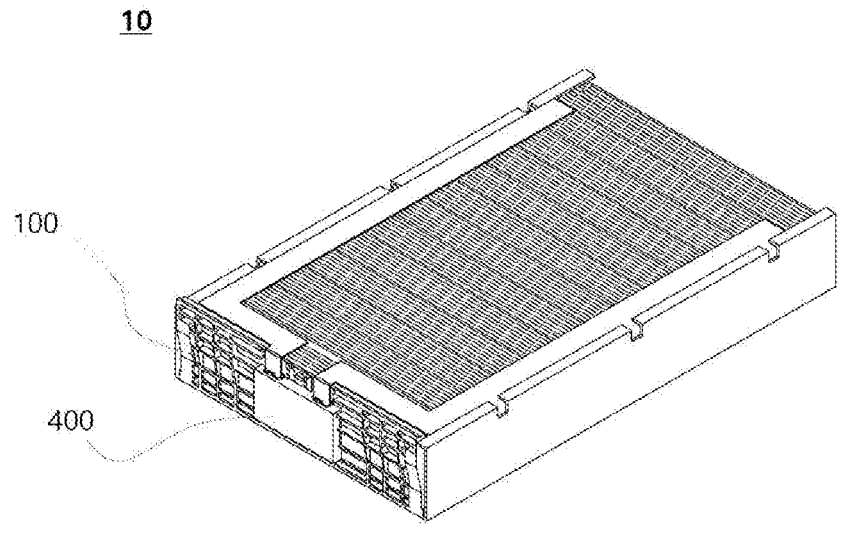
【FIG. 4A】
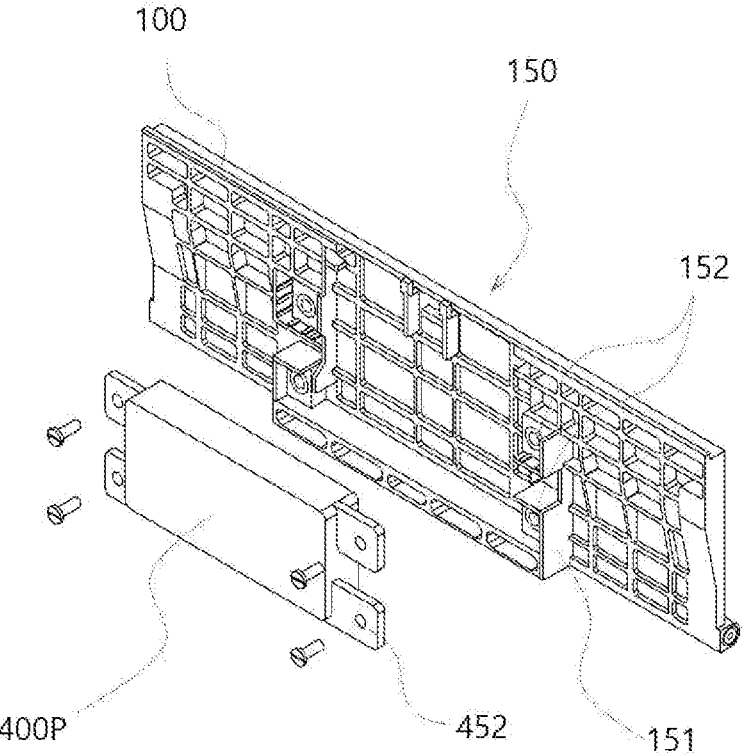

【FIG. 4B】
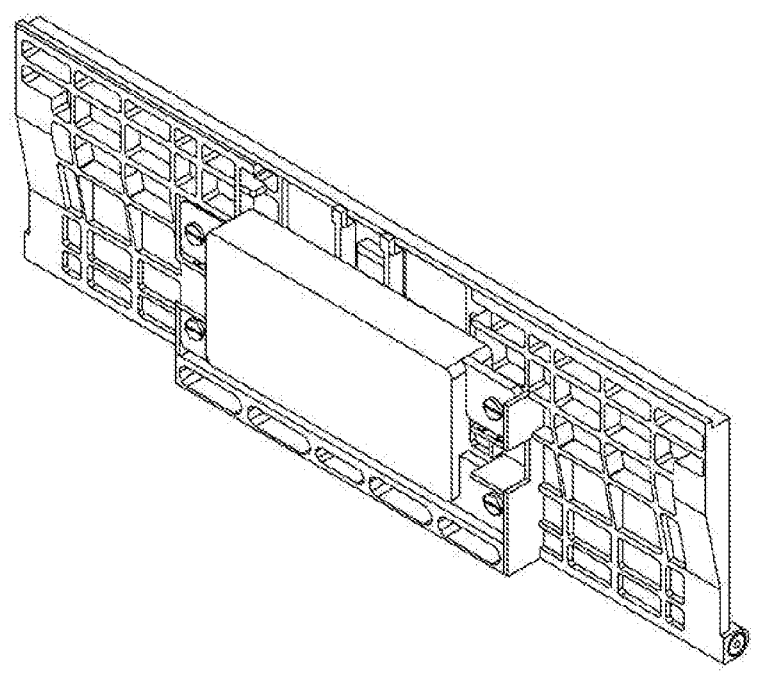

【FIG. 5A】
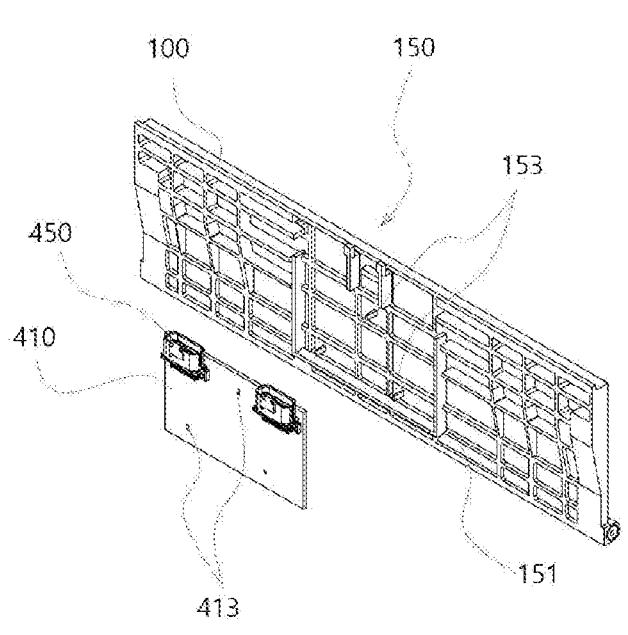
【FIG. 5B】
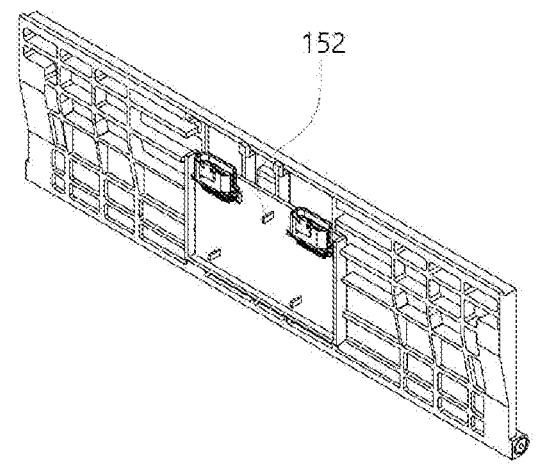

【FIG. 6】
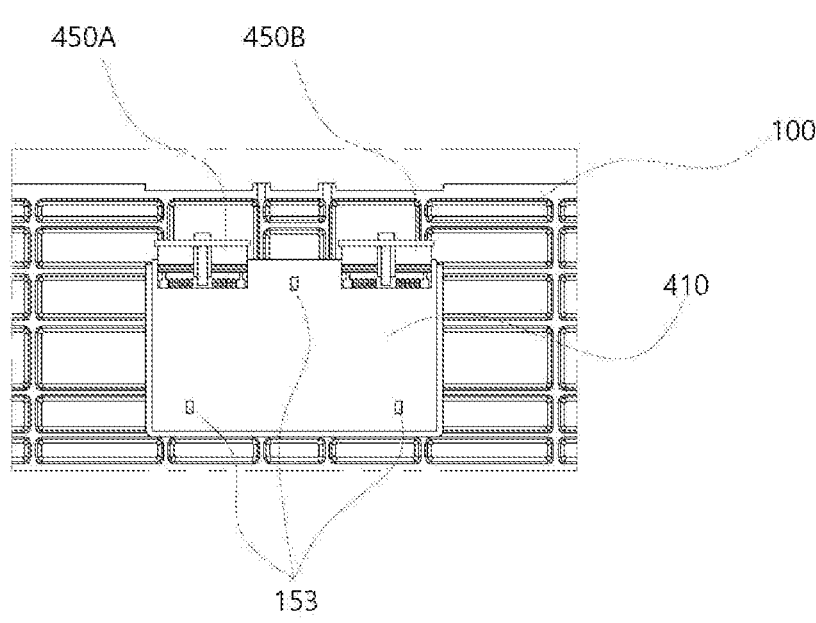

【FIG. 7A】
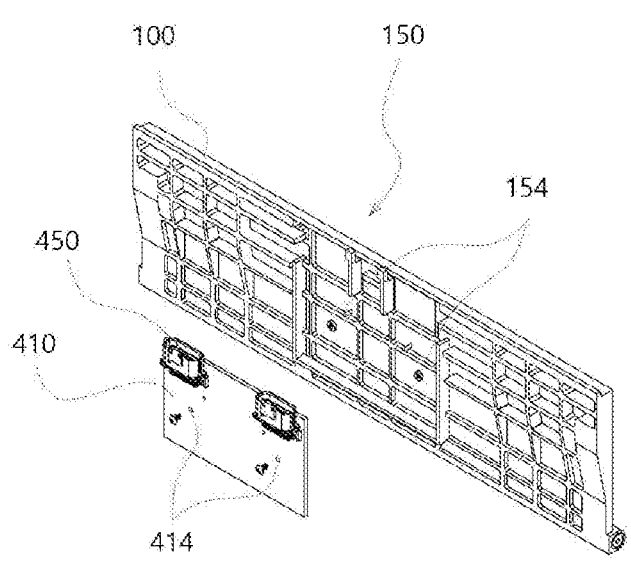
【FIG. 7B】
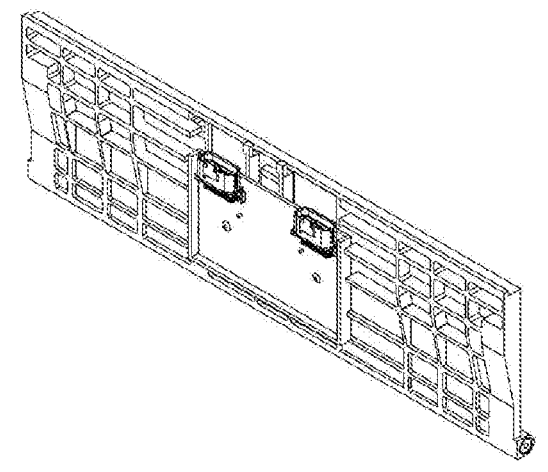

【FIG. 8】
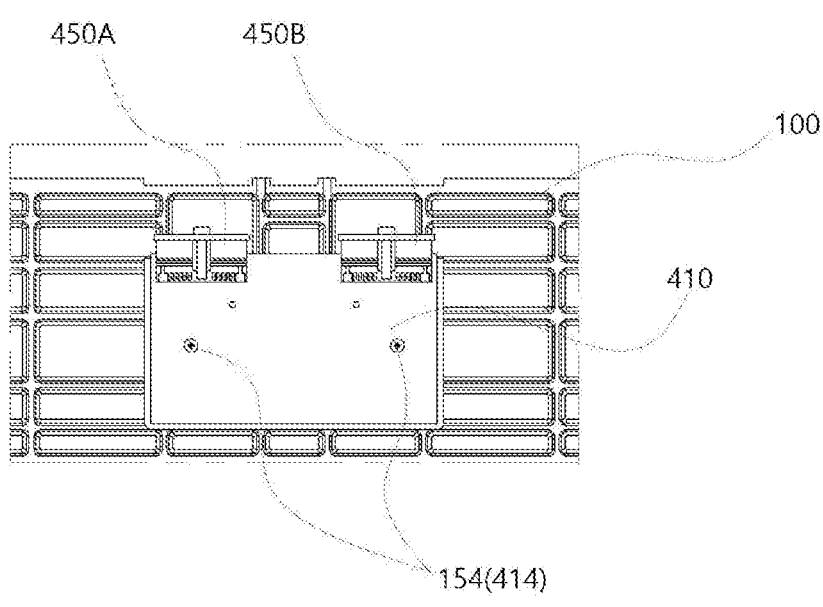

【FIG. 9A】
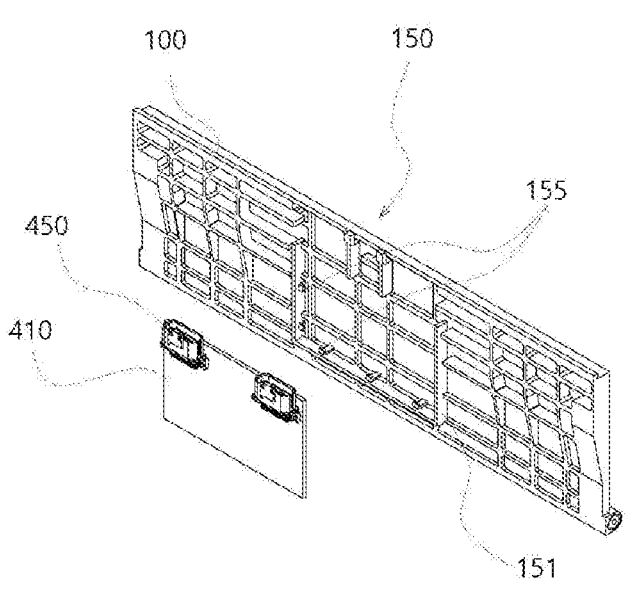
【FIG. 9B】
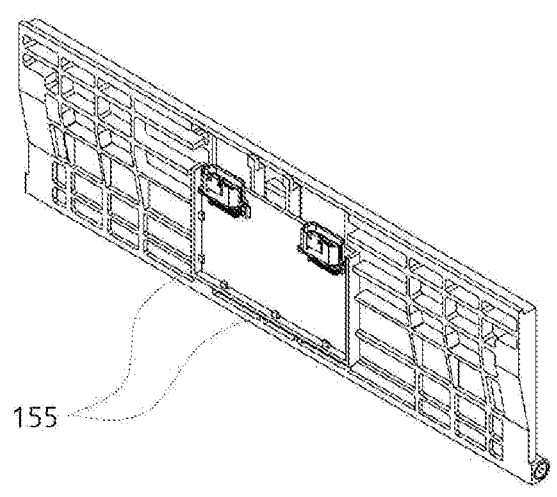

【FIG. 10】
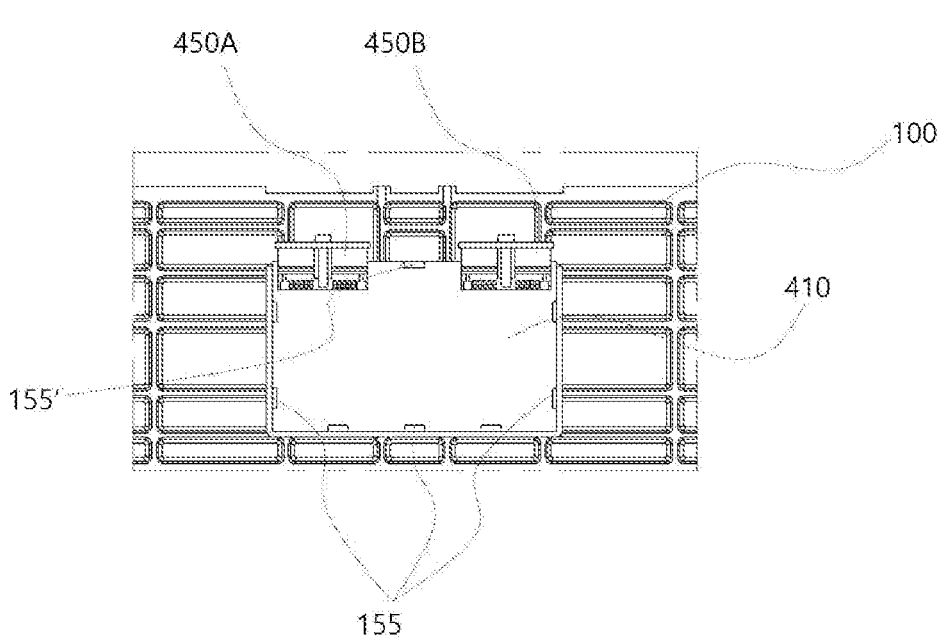

【FIG. 11A】
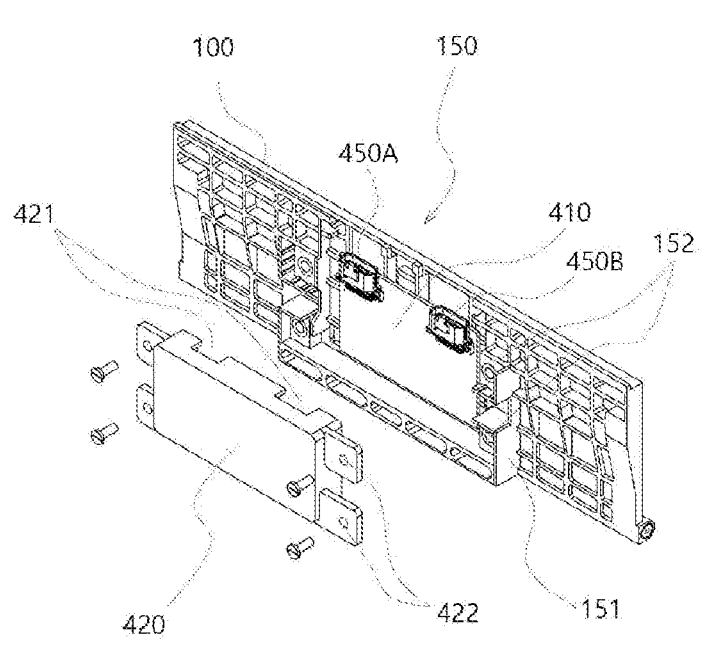
【FIG. 11B】
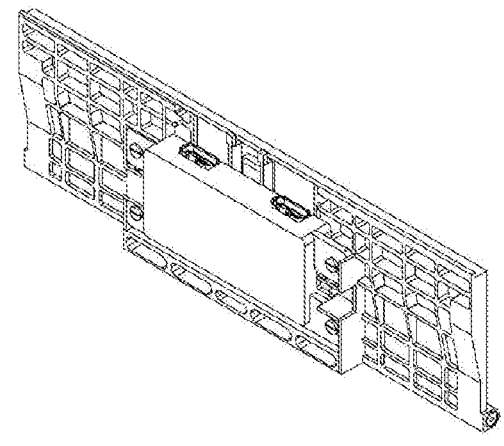

【FIG. 12A】
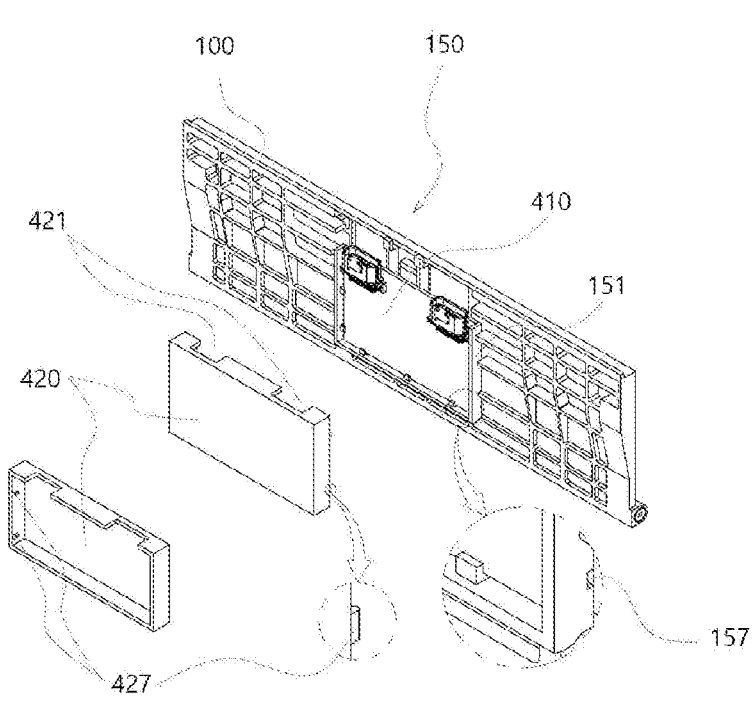

【FIG. 12B】
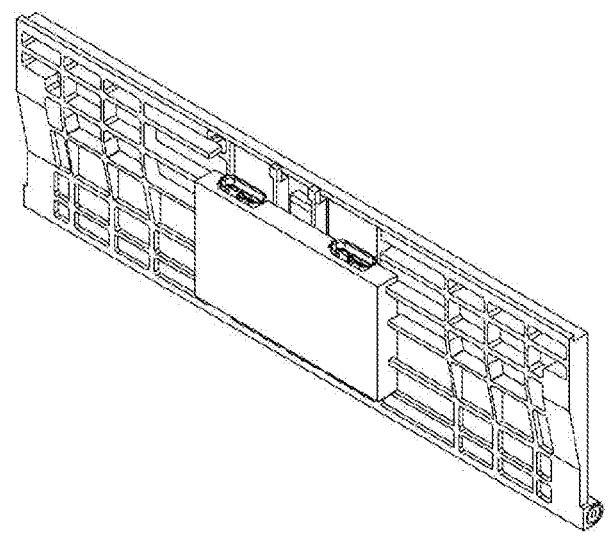

【FIG. 13】
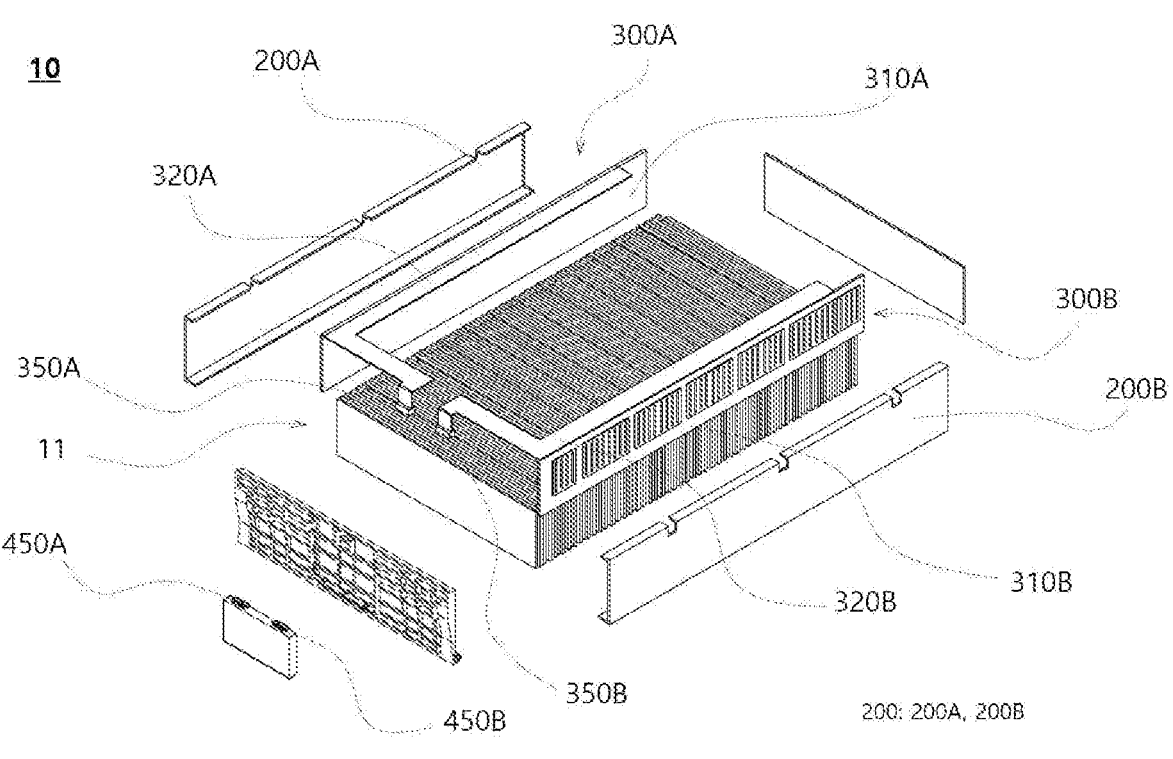
200: 200A, 200B
【FIG. 14】
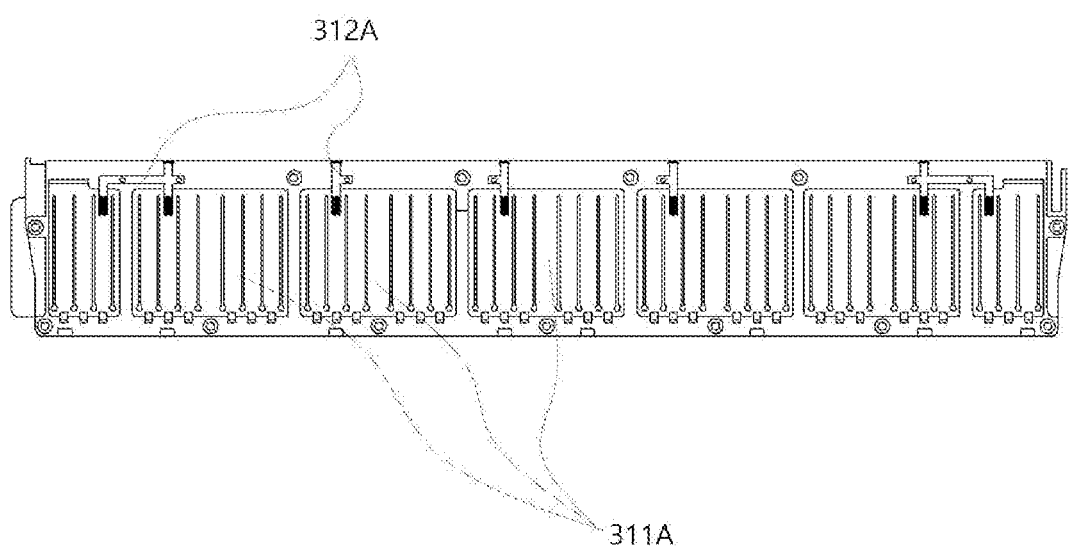

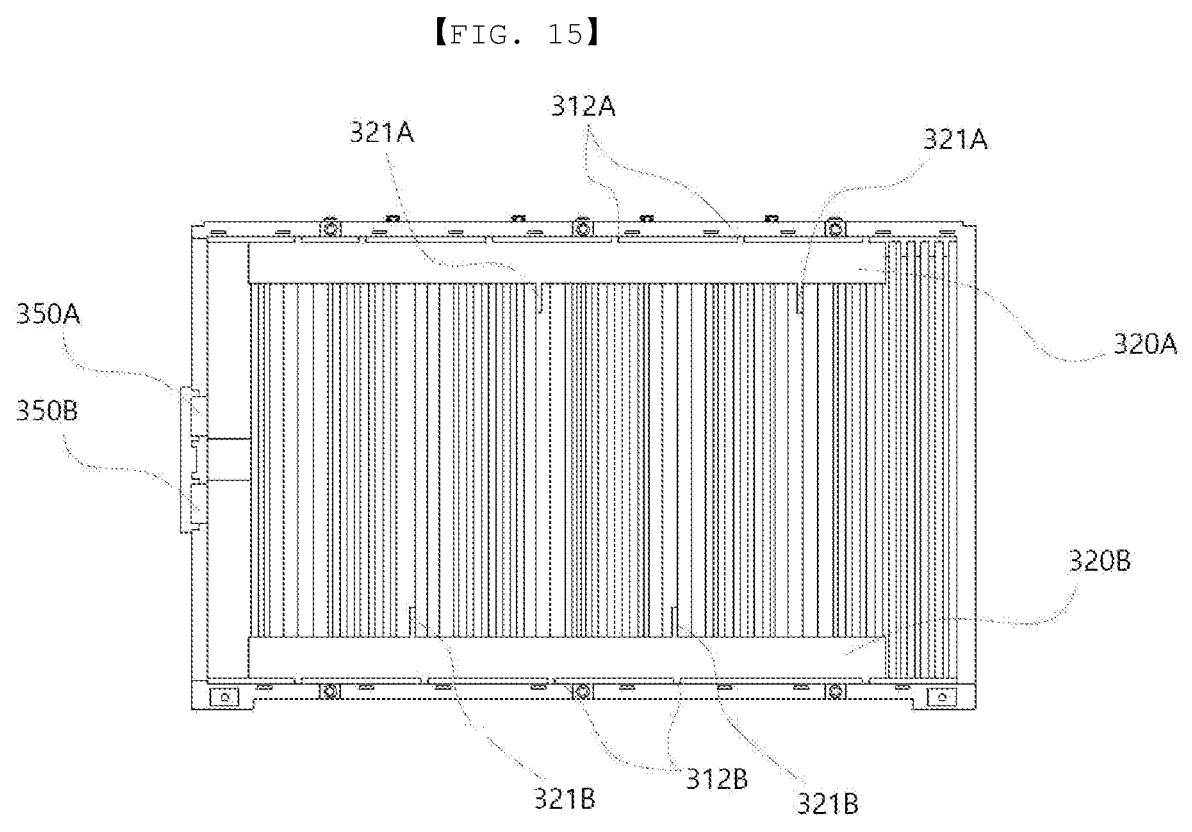

【FIG. 15】

【FIG. 16】
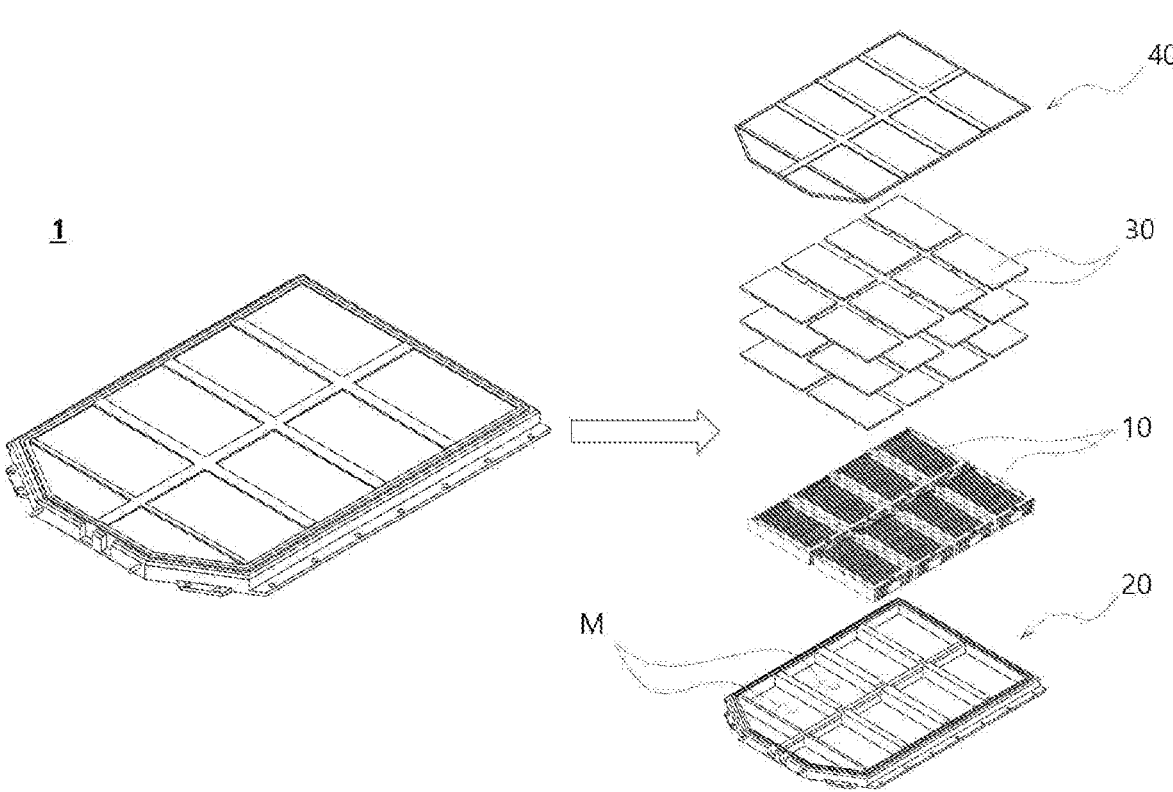

【FIG. 17】
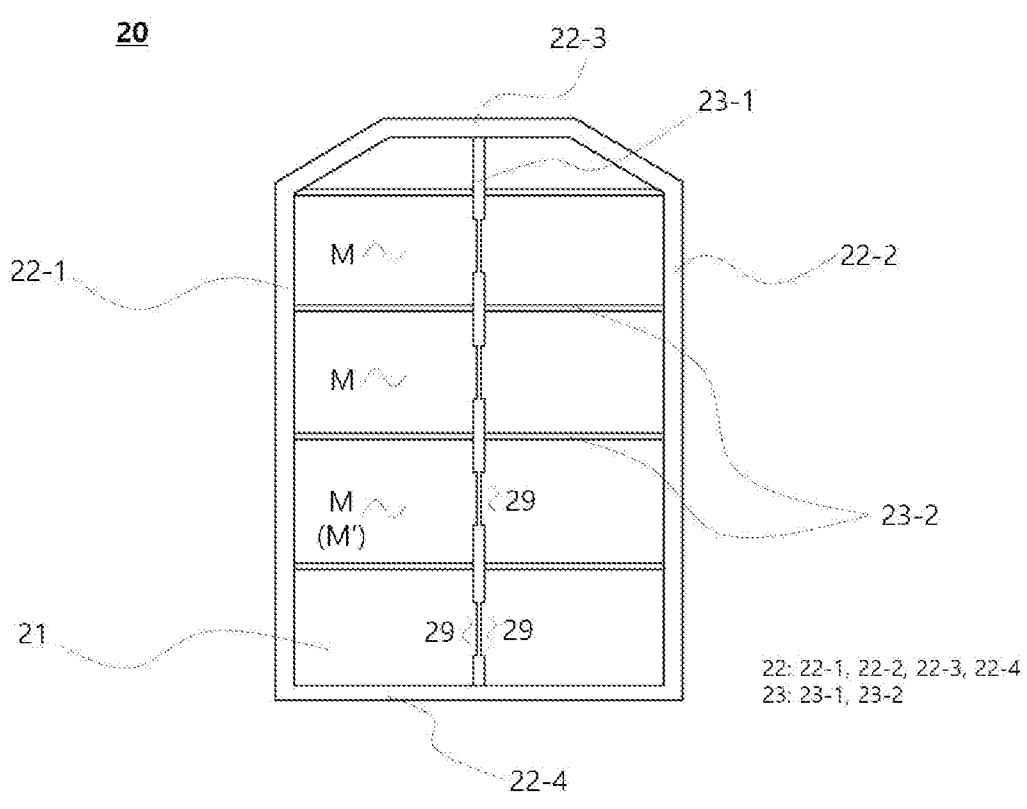

【FIG. 18】
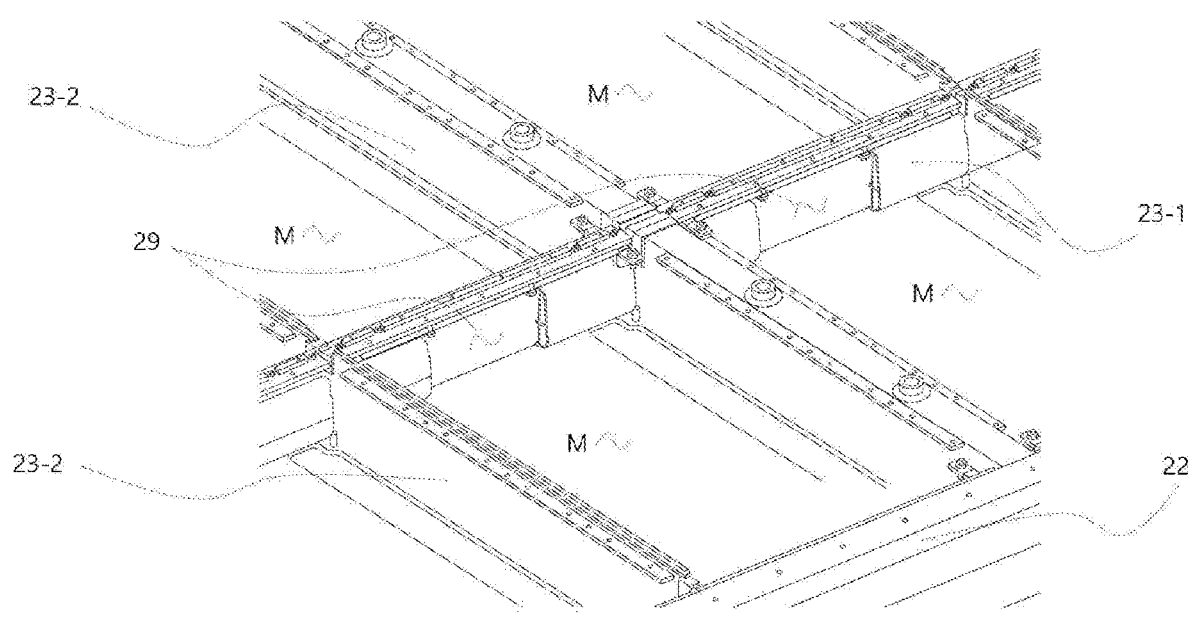

【FIG. 19】
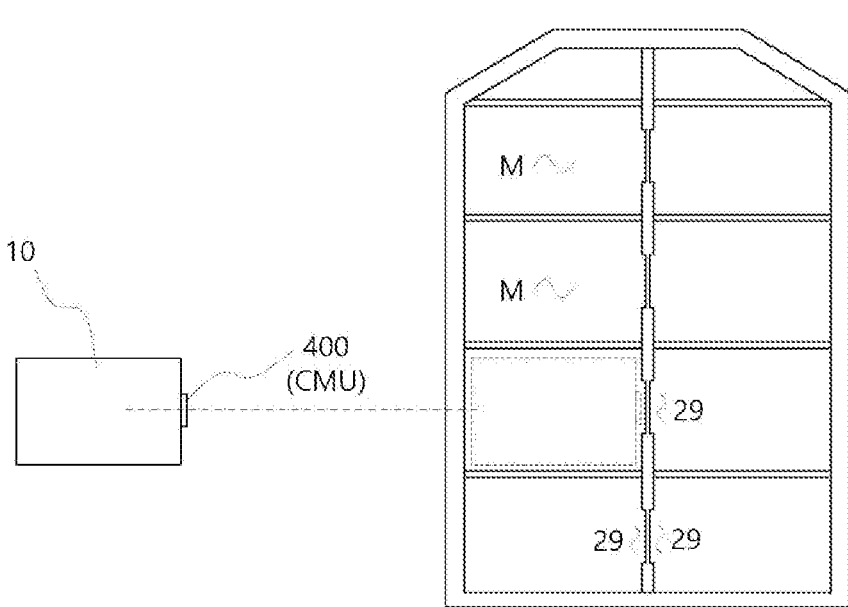

【FIG. 20】
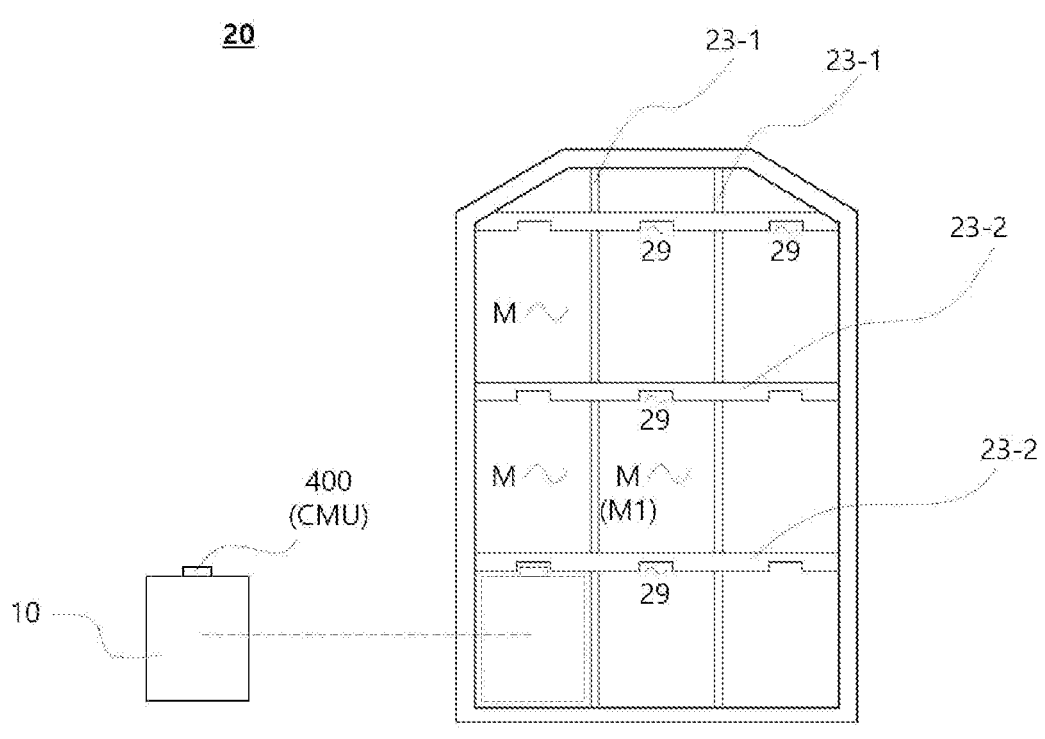

BATTERY PACK INCLUDING A BATTERY MODULE

CROSS-REFERENCE TO RELATED APPLICATION

This application claims priority to Korean Patent Application No. 10-2021-0096328, filed on Jul. 22, 2021, the disclosure of which is hereby incorporated by reference in its entirety.

BACKGROUND OF THE INVENTION

Field of the Invention

The following disclosure relates to a battery module and a battery pack including the same, and more particularly, to a battery module in which a CMU (cell monitoring unit) may be easily and conveniently mounted by providing a CMU mounting part, on which the CMU may be mounted, on an end plate constituting a module case, and a battery pack capable of simplifying the entire manufacturing process of the battery pack and increasing space utilization inside the battery pack by applying the battery module to the battery pack.

Description of Related Art

Secondary batteries that are easy to apply according to product groups and have electrical characteristics such as high energy density are universally applied not only to portable devices, but also to an electric vehicle (EV) or a hybrid vehicle (HEV) driven by an electric driving source. These secondary batteries are attracting attention as a new energy source to improve eco-friendliness and energy efficiency because they not only have the primary advantage of dramatically reducing the use of fossil fuels, but also do not generate any by-products from the use of energy.

The types of secondary batteries currently widely used may include a lithium ion battery, a lithium polymer battery, a nickel cadmium battery, a nickel hydride battery, a nickel zinc battery, and the like. An operating voltage of the unit secondary battery cell, that is, the unit battery cell, is about 2.5 V to 4.6 V. Accordingly, when a higher output voltage is required, a plurality of battery cells are connected in series to constitute a battery pack. In addition, a plurality of battery cells may be connected in parallel to constitute a battery pack according to the charge/discharge capacity required for the battery pack. Accordingly, the number of battery cells included in the battery pack may be variously set according to the required output voltage or charge/discharge capacity.

On the other hand, in the case of constituting the battery pack by connecting the plurality of battery cells in series/parallel, a method of constituting a battery pack by first configuring a battery module including at least one battery cell and adding other components using the at least one battery module is generally used. Here, there may be generally provided a pouch type secondary battery in which the battery cells constituting the battery module or the battery pack may be easily stacked with each other.

As described above, when the battery module including a plurality of battery cells or the battery pack is used, it is very important to monitor the state of the battery module, that is, voltage, current, temperature, or the like of the battery cells. For example, the battery cell may be used in a high-temperature environment like summer, and the battery cell itself may also generate heat. In this case, when the plurality of battery cells are stacked with each other, the temperature of the battery module may further increase. When the temperature is higher than an appropriate temperature, the performance of the battery cells may deteriorate, and in severe cases, there may be a risk of explosion or ignition. In addition, when the temperature of the battery module is too low, the performance of the battery cells included in the battery module may deteriorate. Accordingly, the temperature of the battery module needs to be continuously monitored in order to prevent the deterioration in performance or dangerous situation of the battery cell from occurring or to prepare for such a situation. Similarly, in order to determine the charge/discharge state and lifespan of the battery cell, it is necessary to continuously monitor the voltage and current of the battery cell.

To this end, the battery module is provided with a CMU (cell monitoring unit) as a sensing member. In general, the CMU is separated from the battery module in the battery pack and mounted in a separate space to be connected to the battery module. FIG. 1 illustrates a conventional battery pack. As illustrated, the conventional battery pack 3 provides a storage space inside the battery pack, generally at a position corresponding to the center beam 4, and thus, has a structure in which it accommodates the CMU and other sensing members 5. As described above, a separate space needs to be allocated inside the battery pack to mount the CMU or the like, and as a result, there is a problem in that the space utilization of the battery pack is reduced and the energy density is lowered, and the assembly process, such as receiving the CMU or the like in the battery pack separately from the battery module and fastening using a bolts or the like, increases.

RELATED ART DOCUMENT

Patent Document (Patent Document 1) Chinese Patent No. 106025132 (Jul. 19, 2019)

SUMMARY OF THE INVENTION

An embodiment of the present invention is directed to providing a battery module in which a CMU (cell monitoring unit) may be easily and conveniently mounted by providing a CMU mounting part, on which the CMU may be mounted, on an end plate constituting a module case, and a battery pack capable of simplifying the entire manufacturing process of the battery pack and increasing space utilization inside the battery pack by applying the battery module to the battery pack.

In one general aspect, a battery module includes: a cell assembly in which a plurality of battery cells are stacked; and an end plate disposed on one side of the cell assembly to cover the cell assembly, in which the end plate may include a CMU mounting part where a CMU (cell monitoring unit) for managing the cell assembly is mounted.

The CMU may include a PCB and a PCB cover, and the CMU mounting part may include a bracket protruding from the end plate at a predetermined height and accommodating the PCB therein.

The CMU mounting part may further include at least one protrusion protruding from the end plate at a predetermined height, and the PCB may have a through hole formed at a position corresponding to the protrusion and is mounted inside the bracket through coupling of the through hole and the protrusion.

The PCB may be fixedly coupled to the end plate by thermally fusing the protrusion penetrating through the through hole.

The PCB may be bolted to the end plate.

The CMU mounting part may further include at least one bolt fastening part formed on the end plate, and a bolt fastening hole penetrating through the PCB may be formed in the PCB at a position corresponding to the bolt fastening part.

The CMU mounting part may further include at least one hook protruding from the bracket, and the PCB may be fitted between the hook and the end plate.

The CMU mounting part may further include at least one first bolt fastening part formed on the end plate, a second bolt fastening part may be provided on the PCB cover at a position corresponding to the first bolt fastening part, and the PCB cover may be bolted to the end plate using the first bolt fastening part and the second bolt fastening part.

The CMU mounting part may include at least one first locking groove or a first hook formed in the bracket, a second hook or a second locking groove may be formed in the PCB cover at a position corresponding to the first locking groove or the first hook, and the PCB cover is coupled to the bracket by fastening the first locking groove to the second hook, or the first hook to the second locking groove.

The battery module may further include: a first side cover covering a first surface of the cell assembly; a second side cover covering a second surface of the cell assembly; a first sensing assembly including a first connection block provided between the first side cover and the cell assembly to electrically connect the battery cells and a first sensing member connected to the first connection block and sensing information on at least one of the battery cells; and a second sensing assembly including a second connection block provided between the second side cover and the cell assembly to electrically connect the battery cells and a second sensing member connected to the second connection block and sensing information on at least one of the battery cells.

The first sensing assembly may further include a first sensing connector coupling to the first sensing member, the second sensing assembly may further include a second sensing connector coupling to the second sensing member, the CMU may further include a first PCB connector and a second PCB connector each coupled to the PCB, the CMU and the first sensing assembly are coupled to each other by coupling the first sensing connector with the first PCT connector, and the CMU and the second sensing assembly are coupled to each other by coupling the second sensing connector with the second PCT connector.

Each of the first sensing member and the second sensing member may be formed of FPCB.

In another general aspect, a battery pack includes: the battery module described above; a plate on which the battery module is disposed; an outer frame that is formed at a predetermined height outside the plate; and at least one inner frame that partitions an inner space formed by the plate and the outer frame into a plurality of module spaces, in which the inner frame may be formed so that a side surface is indented inward to accommodate the CMU of the battery module.

The plate may include a cooling pipe, and a thermally conductive resin layer is provided on the plate, and the cell assembly of the battery module directly contact with the thermally conductive resin layer.

The battery pack may further include: a module space cover for shielding each of the module spaces provided on an upper portion of the battery module, and a battery pack cover for shielding the inner space provided on the upper portion of the module space cover.

BRIEF DESCRIPTION OF THE DRAWINGS

FIG. 1 is a diagram illustrating a battery pack according to the related art.

FIG. 2 is an exploded perspective view of a battery module according to an exemplary embodiment of the present invention.

FIG. 3 is a coupling view of FIG. 2.

FIGS. 4A and 4B are diagrams illustrating that a CMU component is mounted on an end plate.

FIGS. 5A and 5B are diagrams illustrating thermal fusion bonding of a PCB and the end plate, FIG. 6 is a front view of FIG. 5B.

FIGS. 7A and 7B are diagrams illustrating a bolted connection of the PCB and the end plate, FIG. 8 is a front view of FIG. 7B.

FIGS. 9A and 9B are diagrams illustrating a snap-fit connection between the PCB and the end plate, and FIG. 10 is a front diagram of FIG. 9B.

FIGS. 11A and 11B are diagrams illustrating the bolted connection between the PCB cover and the end plate.

FIGS. 12A and 12B are diagrams illustrating the snap-fit connection between the PCB cover and the end plate.

FIG. 13 is a diagram illustrating FIG. 2 again.

FIG. 14 is a diagram illustrating a first connection block according to an example of the present invention.

FIG. 15 is a diagram illustrating FIG. 3 viewed from the top.

FIG. 16 is a diagram illustrating a battery pack according to an example of the present invention.

FIG. 17 is a diagram illustrating the battery pack case of FIG. 16 viewed from the top.

FIG. 18 is a diagram illustrating an exemplary embodiment of an indentation groove.

FIG. 19 is a diagram schematically illustrating that the battery module is received in the battery pack case.

FIG. 20 is a diagram schematically illustrating a battery pack case according to another example of the present invention.

DETAILED DESCRIPTION OF MAIN ELEMENTS

1: Battery pack
10: Battery module
11: Cell assembly
12: Module case
100: End plate
150: CMU mounting part
200: Side cover
13: Sensing assembly
300A, 300B: First and second sensing assembly
310A, 310B: First and second connection block
320A, 320B: First and second sensing member
350A, 350B: First and second sensing connector
400: CMU
410: PCB
420: PCB cover
450A, 450B: First and second PCB connector
20: Battery pack case
30: Module cover
40: Battery pack cover

DESCRIPTION OF THE INVENTION

Hereinafter, the present invention will be described in detail with reference to the accompanying drawings.

FIG. 2 is an exploded perspective view of a battery module according to an exemplary embodiment of the present invention, and FIG. 3 is a coupling view of FIG. 2. As illustrated, a battery module 10 of the present invention may largely include a cell assembly 11, a module case 12, and a sensing assembly 13.

The cell assembly 11 has a structure in which a plurality of battery cells 11c are stacked, and may have a structure in which side surfaces of the battery cells 11c are adjacent to each other and stacked in parallel. The battery cell of the present invention is a pouch type secondary battery, and may be configured in a structure in which an electrode assembly is accommodated in a pouch case, a pair of electrode leads protrudes to an outer side of the pouch case, and the pair of electrode leads protrude to face each other on one side and the other side of the pouch case.

The module case 12 accommodates the cell assembly 11, and may cover at least one of side surfaces of the cell assembly 11 and structurally fix the cell assembly 11. The module case 12 of the present invention includes a pair of end plates 100 that is disposed at the front and rear of the cell assembly, respectively, to cover front and rear surfaces of the cell assembly, and a pair of side covers 200 that is provided on both side surfaces of the cell assembly, respectively, to cover both sides surfaces of the cell assembly.

The sensing assembly 13 may perform a function of electrically connecting battery cells constituting the cell assembly to each other and sensing information on the battery cells, for example, voltage, temperature, or the like of the cells, and contents thereof will be described below in more detail.

In this case, in the battery module of the present invention, a CMU mounting part 150 may be provided on at least one end plate 100 of the pair of end plates 100. A cell monitoring unit (CMU) 400 is a device that manages battery cells. More specifically, the CMU may perform a function of sensing voltage, current, temperature, or the like of the cells in the battery module, and transmitting the information to a battery management unit (BMU) via a CAN interface in a wired or wireless manner.

This CMU needs to be connected to the cells of the battery module. To this end, the CMU needs to be disposed adjacent to the battery module. According to the present invention, the CMU mounting part may be provided on the end plate to mount the CMU on the end plate, thereby making it easy and convenient to mount the CMU on the battery module In addition, even when the CMU is configured of one component as an individual component, according to the present invention, the CMU is simply mounted on an end plate regardless of a type of CMU component to connect to a battery module, thereby greatly increasing compatibility between the battery module and the CMU component.

FIGS. 4A and 4B are diagrams illustrating that the CMU component is mounted on the end plate, and FIGS. 4A and 4B illustrate an exploded view and a coupling view, respectively. The CMU mounting part 150 provided on the end plate 100 is not particularly limited in size, shape, structure, or the like. For example, however, the CMU mounting part 150 may have a structure in which a bracket 151 that has a CMU part 400P accommodated therein to be positioned is provided. To this end, the bracket may be configured to protrude to a predetermined height from the end plate 100 along an outer shape of the CMU component 400P. As illustrated, the CMU component 400P may be seated on the bracket 151 of the CMU mounting part 150 and positioned, and then finally coupled to the end plate 100 through a bolted connection or the like. To this end, the case of the CMU component 400P is provided with a bolt fastening part 452 into which a bolt may be inserted, and a bolt fastening part 152 to which the end portion of the bolt is fastened and fixed may be formed on the end plate 100. In this case, the bolt fastening part 152 on the end plate may be provided with a nut, or a groove may be formed in the end plate itself, and a thread may be formed in the groove.

In the present invention, the end plate with the CMU mounting part may be manufactured through injection molding. In this case, the end plate may be made of a plastic material. By manufacturing the end plate through plastic injection molding, it is easy to form the CMU mounting part having a predetermined shape or structure on the end plate, and compared to the conventional end plate made of metal, it is possible to reduce weight and manufacturing cost and to secure better insulation performance between the CMU and the end plate.

In the battery module of the present invention, the end plate with the CMU mounting part may be provided on only one side of the front and rear surfaces of the cell assembly, or on both the front and rear surfaces of the cell assembly. Since the battery module and the CMU have a one-to-one correspondence, the CMU mounting part may be provided on only one end plate. Accordingly, one side of the front or rear surfaces of the cell assembly may be provided with the end plate on which the CMU mounting part is provided, and the other side may be provided with the end plate made of a general metal material on which the CMU mounting part is not provided. However, when the end plates with the CMU mounting parts are provided on both sides, the end plates on both sides may be configured identically, so there is an advantage in terms of ease of manufacture because it is not necessary to separately manufacture the end plates each provided on the front and rear surfaces of the cell assembly.

Hereinafter, the battery module equipped with the CMU will be described. As illustrated in FIG. 3, in the battery module of the present invention, the CMU is mounted on the CMU mounting part provided on the end plate, so the CMU and the battery module may be integrated.

The CMU 400 of the present invention may include a PCB (printed circuit board) 410 and a PCB cover 420. The CMU component 400P described in FIGS. 4A and 4B above is an individual component in which the PCB is accommodated inside the case and is directly mounted on the end plate. On the other hand, the CMU 400 of the present invention includes the PCB 410 and the PCB cover 420. First, the PCB is mounted on the end plate, and the PCB case is mounted on the end plate to cover the PCB, so the end plate 100 may finally be provided with a CMU 400.

First, in the battery module of the present invention, the PCB may be fixedly coupled to the end plate using thermal fusion. FIGS. 5A and 5B are diagrams illustrating thermal fusion bonding between the PCB and the end plate. FIGS. 5A and 5B each illustrate an exploded view and a coupling view, and FIG. 6 is a front view of FIG. 5B.

As illustrated, the CMU mounting part 150 may include a bracket 151 protruding from the end plate 100 to a predetermined height to accommodate the PCB therein. In this case, as illustrated, the bracket 151 may be disposed near the center of the end plate 100, and may be formed in an approximately U-shape to support the lower portion of the PCB 410 and fix the left and right sides of the PCB 410. Hereinafter, in each example, the bracket may be configured to be the same as the bracket of this example.

In this example, one or more protrusions 153 protruding from the surface of the end plate 100 to a predetermined height may be formed on the end plate 100 located inside the bracket 151, and a through hole 413 penetrating through the PCB 410 may be formed in the PCB 410 at a position corresponding to the protrusion 153, so when the PCB is mounted inside the bracket, the protrusion may be penetrately inserted into the through hole of the PCB. Then, after the PCB mounting is completed, the protruding portion of the protrusion penetrating through the through hole of the PCB is melted, and thus, the protrusion is thermally fused with the PCB, so the PCB may be finally fixedly coupled to the end plate. Here, as the end plate is manufactured through plastic injection molding, the protrusion may be formed simultaneously with injection ribs, and it is more preferable to form the protrusion higher than the thickness of the PCB so that the protrusion penetrates through the through hole and the end portion protrudes outside the PCB.

According to this example, when the PCB is mounted on the end plate, the protrusion is penetrately inserted into the through hole to help position the PCB at the desired position, after the PCB is positioned in place, it is only necessary to melt the projection, so no additional fixing members are required, and furthermore, the PCB can be semi-permanently bonded to the end plate through thermal fusion, thereby obtaining excellent bonding durability. Next, in the battery module of the present invention, the PCB may be bolted to the end plate. FIGS. 7A and 7B are diagrams illustrating the bolted connection of the PCB and the end plate. FIGS. 7A and 7B each illustrate an exploded view and a coupling view, and FIG. 8 is a front view of FIG. 7B.

As a specific example of the bolted connection, one or more bolt fastening holes 414 penetrating through the PCB may be formed in the PCB 410, a bolt fastening part 154 may be formed in the end plate 100 located inside the bracket 151 at a position corresponding to the bolt fastening hole 414 of the PCB, and after the PCB is seated inside the bracket, the bolt penetrates through the bolt fastening hole 414 and is coupled to the bolt fastening part 154, so the PCB may be finally coupled to the end plate. As described above, the bolt fastening part 154 of the end plate may have a structure in which a bolt fastening groove is formed inward from the surface of the end plate and a thread is provided inside the bolt fastening groove, or have a structure in which the groove is formed in the end plate, and a nut is inserted and fixed into the groove.

In this example, the bonding difficulty is lower than that of the previous thermal fusion bonding, so there is an advantage in that the assembly is easy, and furthermore, the PCB replacement may be made when there is a defect in the PCB.

Next, in the battery module of the present invention, the PCB may be coupled to the end plate in a snap-fit manner. FIGS. 9A and 9B are diagrams illustrating the snap-fit connection between the PCB and the end plate, FIGS. 9A and 9B each illustrate an exploded view and a coupling view, respectively, and FIG. 10 is a front view of FIGS. 9A and 9B.

In this example, one or more hooks 155 protruding from the bracket 151 and, more specifically, protruding from the inner side surface of the bracket 151 may be formed on the bracket 151. The hook 155 is formed at a height spaced apart from the surface of the end plate 100 by a predetermined distance, so the PCB 410 may be fitted between the hook 155 and the surface of the end plate 100. Referring to FIG. 10, one or more hooks 155 may be formed on each side to fix the left, right, and lower sides of the PCB, and hooks 155' protruding directly from the end plate may be further formed on the upper portion of the PCB. As described above, as the hook is provided in the bracket, when the PCB is mounted inside the bracket, the PCB may be fitted between the hook and the end plate to be coupled to the end plate. Even in this example, the hook and the bracket may be simultaneously manufactured through the plastic injection molding of the end plate.

In this example, there is no need to use separate members such as screws or drivers compared to the bolted connection in the previous example, so there is an advantage in that the assembly of the PCB is simpler, and furthermore, the attachment and detachment of the PCB is very easy.

Furthermore, as described above, after the battery module of the present invention is mounted and coupled to the end plate 100, more specifically, the PCB 410 on the end plate 100 located in the CMU mounting part 150, by further providing the PCB cover 420 that covers the PCB 410, it is possible to prevent the PCB from being exposed from the outside and protect the PCB. The PCB cover 420 may be provided on the end plate in various ways to cover the PCB and coupled. For example, the PCB cover 420 may be bolted to the end plate 100 or coupled to the end plate 100 in the snap-fit manner.

FIGS. 11A and 11B are diagrams illustrating the bolted connection between the PCB cover and the end plate. FIGS. 11A and 11B each illustrate an exploded view and a coupling view. There is no particular limitation on the shape and structure of the PCB cover 420. For example, as illustrated, the PCB cover 420 may be formed in the form of a box with one side open, and the PCB may be inserted into the opened side, and thus, formed in a structure in which the PCB is accommodated therein. In this case, first and second PCB connectors 450A and 450B may each be coupled to the PCB cover 420, and accordingly, the PCB connector receiving groove 421 may be formed at positions corresponding to the first and second PCB connectors among the PCB covers, for example, on the upper portion of the PCB cover in FIGS. 11A and 11B.

In this example, as illustrated, one or more first bolt fastening parts 152 may be formed on the end plate 100 located inside the bracket 151, and the PCB cover 420 may be provided with the second bolt fastening part 422 at a position corresponding to the first bolt fastening part 152, so the PCB cover 420 may be bolted to the end plate 100 using the first and second bolt fastening parts 152 and 422. That is, after the PCB cover is disposed so that the first bolt fastening part and the second bolt fastening part are positioned on the same line, the bolt penetrates through the first bolt fastening part and is coupled to the second bolt fastening part, so the PCB cover may be finally installed on the end plate. The first bolt fastening part of the end plate may have the same structure as the bolt fastening part in FIGS. 4A and 4B and 7A and 7B described above. Meanwhile, unlike those illustrated, it goes without saying that the first bolt fastening part may be positioned outside the bracket instead of the first bolt fastening part being positioned on the inside of the bracket.

FIGS. 12A and 12B are diagrams illustrating the snap-fit connection between the PCB cover and the end plate, and FIGS. 12A and 12B each illustrate an exploded view and a coupling view. In order to couple the PCB cover and the end plate in the snap-fit manner, a locking groove may be formed in any one of the PCB cover and the end plate and a hook corresponding to the locking groove may be formed in the other of the PCB cover and the end plate. More specifically, referring to FIGS. 12A and 12B as an example, one or more first locking grooves 157 may be formed on the outer side surface of the bracket 151 and a second hook 427 may be formed at a position corresponding to the first locking groove 157 on the inner side of the PCB cover 420, so the first locking groove 157 of the bracket and the second hook 427 of the PCB cover are locked to each other, and thus, the PCB cover 420 may be coupled to the bracket 151. On the other hand, although not illustrated, on the contrary, the first hook may be formed on the outer side surface of the bracket and the second locking groove may be formed on the inner side surface of the PCB cover.

As described above, the end plate of the present invention is provided with the CMU mounting part, and thus, the CMU may be mounted on the end plate to be integrally formed. In this case, the CMU is an individual component, and the CMU component itself is mounted on the end plate, or each of the PCB and the PCB cover is coupled to the end plate, so the CMU may be provided on the end plate.

Hereinafter, the structure of the battery module 10 of the present invention will be described in more detail. FIG. 13 is a view illustrating FIG. 2 again. As described above, the battery module 10 of the present invention may include a cell assembly 11, a module case 12, and a sensing assembly 13, the module case may include a pair of end plates 100 and a pair of side covers 200, the pair of side covers 200 may include a first side cover 200A covering a first surface (for example, left side surface of the cell assembly in the drawing) of the cell assembly 11 and a second side cover 200B covering a second surface (for example, right side surface which is the other side surface of the cell assembly in the drawing), and the sensing assembly 13 may include a first sensing assembly 300A disposed on one side surface of the cell assembly 11 and a second sensing assembly 300B disposed on the other side surface of the cell assembly 11.

The first side cover 200A and the second side cover 200B are each provided on one side and the other side of the cell assembly to cover one side and the other side of the cell assembly, and may be formed in a plate shape.

The first sensing assembly 300A includes a first connection block 310A and a first sensing member 320A integrally formed therein, and the first connection block 310A is provided between the first side cover 200A and the cell assembly 11 to electrically connect the battery cells, and the first sensing member 320A may be connected to the first connection block 310A to sense information on at least some of the battery cells, for example, voltage, current, temperature, or the like of the battery cells. Furthermore, the first sensing assembly 300A may further include a first sensing connector 350A connected to the first sensing member 320A, and the first sensing connector 350A may be disposed to extend from an end portion of the first sensing member 320A. Since the second sensing assembly 300B has a structure symmetrical to the first sensing assembly 300A and may be configured substantially the same, a detailed description thereof will be omitted.

In the present invention, the reason why the sensing assembly 300 is separated into the first sensing assembly 300A and the second sensing assembly 300B is to distinguish between the processing on the positive side and the processing on the negative side in the battery cell, and any one of the first and second sensing assemblies may be provided on the positive side of the battery cells, and the other of the first and second sensing assemblies may be provided on the negative side of the battery cells.

FIG. 14 is a diagram illustrating a first connection block according to an exemplary embodiment of the present invention. The first connection block 310A may be formed in a plate shape, and may include a plurality of connection members 311A that are provided in the first connection block 310A, are formed in a plate shape, made of a conductive material, connected to electrode leads of the battery cells, and, include a bus bar 312A that electrically binds any one of the connection members and another adjacent connection member and connects the connection member and the first sensing assembly separately or at the same time, and may appropriately dispose them to connect adjacent battery cells in series or in parallel, and electrically connect the battery cells and the first sensing assembly to each other. Since the second connection block 310B has a structure symmetrical to the first connection block 310A and may be configured substantially the same, a detailed description thereof will be omitted.

FIG. 15 is a view of FIG. 3 views from the top. As illustrated, the first and second sensing members 320A and 320B may be connected to the first and second connection blocks 310A and 310B, respectively, via the above-described bus bars 312A and 312B of the first and second connection blocks 310A and 310B, and the first and second sensing members 320A and 320B may each be provided with one or more temperature sensors 321A and 321B for measuring the temperature of the battery module or the battery cells. In this case, in the present invention, the first sensing member and the second sensing member are preferably made of FPCB in order to prevent disconnection due to vibration or the like while traveling when the battery module is mounted on a vehicle. The FPCB has excellent insulation, heat resistance and flexibility, which is advantageous for simplifying a wiring structure of the battery modules.

Furthermore, referring back to FIGS. 5A and 5B and 6, as described above, the first PCB connector 450A and the second PCB connector 450B may be coupled to the PCB 410, and thus, the first sensing connector 350A is assembled to the first PCB connector 450A, and the second sensing connector 350B is assembled to the second PCB connector 450B, so the CMU 400 and the sensing assembly 300 are connected to each other.

Since the battery module of the present invention is configured such that the battery cells of the cell assembly and the CMU may be connected to each other through the connector, the compatibility with various types of CMUs may increase. In this case, the CMU and the battery cells may be easily and conveniently connected to each other through connectors.

Meanwhile, the battery module 10 of the present invention may have a structure in which the module case 12 is simplified so that the cell assembly 11 can be directly seated on the battery pack case as will be described later.

More specifically, the module case 12 of the present invention may include a pair of end plates 100 covering the front and rear surfaces of the cell assembly and a pair of side covers 200 covering both side surfaces of the cell assembly. In this case, the module case 12 does not have a lower cover member to completely cover the lower portion of the cell assembly, and thus, the lower portion of the cell assembly may be configured such that most of the lower portion of the cell assembly is exposed to the outside as it is.

That is, the battery module of the present invention may not have a lower cover covering the lower portion of the cell assembly, unlike the conventional battery module, which simplifies a module case by removing unnecessary parts from the module case of the conventional battery module. By reducing the size of the module, it is possible to increase the storage ratio of the battery cells to the total volume of the battery pack. As will be described later, when the battery module of the present invention is received in the battery pack case, the lower portion of the cell assembly and the bottom surface of the module case are formed in a structure in which they are in direct contact with each other, so the heat exchange performance between the cell assembly and the module case may be further improved.

Hereinafter, a battery pack according to the present invention will be described.

FIG. 16 illustrates a battery pack according to an exemplary embodiment of the present invention. As illustrated, the battery pack 1 of the present invention may include battery modules 10 and a battery pack case 20 for accommodating the battery modules. The battery pack 1 of the present invention is applied with the above-described battery module 10, and the battery modules 10 may be received in the battery pack case 20.

FIG. 17 illustrates the battery pack case of FIG. 16 viewed from the top, and the battery pack case 20 may largely include a plate 21, an outer frame 22, and a partition frame 23.

The plate 21 is a place where the battery modules 10 are disposed, and the plate may be configured in the form of a flat plate having an approximately large area, and may be positioned under the battery modules to cover the lower portion of the battery module.

The outer frame 22 is formed at the outside of the plate to a predetermined height, and the outer frame may include a left frame 22-1, a right frame 22-2, a front frame 22-3, and a rear frame 22-4 each of which is located on the left, right, front, and rear of the plate 21 along the outer perimeter of the plate, and may be disposed on the left, right, front, and rear of the plate, respectively, to cover the side surfaces of the battery modules.

The partition frame 23 partitions an inner space formed by the plate 21 and the outer frame 22, that is, an inner space defined in a box shape by the plate and the outer frame into a plurality, and the partition frame 23 may be provided with one or more center beams 23-1 and cross beams 23-2 in a lattice form. The center beam 23-1 may mean a frame disposed in a front-rear direction on the plate, and the cross beam 23-2 may mean a frame disposed in a left-right direction on the plate.

In this way, the inner space of the case may be partitioned into a plurality of zones by the partition frame 23, that is, the center beam 23-1 and the cross beam 23-2, and the battery modules 10 are individually installed in each zone. Here, when each zone is referred to as a module space M in the present invention, each module space M may have a structure in which the side surfaces are surrounded by the partition frame 23 (when two or more center and cross beams are each provided, the module space is surrounded by the center beam and the cross beam, see M1 in FIG. 20), or have a structure in which the side surfaces are surrounded by the outer frame 22 and the partition frame 23.

In this case, in the present invention, at least one of the frames (that is, the partition frame, or the outer frame and the partition frame) surrounding each module space M may be provided with an indentation groove 29 in which the side surface of the frame is indented inwardly. For example, referring to one module area M' in FIG. 17, a left side surface of the module area M' may be provided with a left frame 22-1 among the outer frames, a front side surface thereof may be provided with a cross beam 23-2 among the partition frames, a right side surface thereof may be provided with a center beam 23-1 among the partition frames, and a rear side surface thereof may be provided another cross beam 23-2 among the partition frames, so the module area M' may have a structure in which it is surrounded by the frames 22 and 23. In this case, the center beam 23-1 located on the right side of the module area M' may be provided with an indentation groove 29 in which a partial area of the side facing the module area M' is depressed inward. FIG. 18 is a diagram illustrating an exemplary embodiment of the indentation groove. A specific exemplary embodiment of the indentation groove may be confirmed. More specifically, the indentation groove 29 is formed on the side surface of the center beam 23-1 located in each module space M, and when viewed with respect to the center beam 23-1, one side surface and both side surfaces of the center beam 23-1 may each be provided with one or more indentation grooves 29, and the height of the indentation groove 29 may be the same as the height of the center beam 23-1.

FIG. 19 is a diagram schematically illustrating that the battery module is received in the battery pack case. As illustrated, the CMU of the battery module 10 may be accommodated in the indentation groove 29 formed on at least one side of the frames surrounding the module space M 400. That is, when the CMU is mounted on the end plate of the battery module, the CMU may be formed to protrude outward from the end plate, and in the present invention, the indentation groove that may accommodate the CMU is formed in the frames, and the protruding CMU may be accommodated in the corresponding indentation groove, so the space utilization inside the battery pack case may be maximized, and thus, the energy density of the battery pack may increase.

FIG. 20 schematically illustrates a battery pack case according to another example of the present invention. As illustrated, two center beams 23-1 may be provided in the battery pack case 20 of this example, and the battery modules 10 are each arranged in a front-rear direction, so the battery modules 10 may be arranged in a total of three rows, and may have a structure in which the above-described indentation groove 29 may be formed in the cross beam 23-2. As in the examples of FIGS. 19 and 20, the battery pack case of the present invention may be designed in various structures by appropriately combining the configuration of the outer frame 22, the partition frame 23, and the indentation groove 29.

On the other hand, referring back to FIG. 16, the battery pack 1 of the present invention may further include a module space cover 30 covering the module space and a battery pack cover 40 covering the battery pack case 20 as a whole.

The module space cover 30 is provided on each of the upper portions of the plurality of module spaces M to shield each module space M, and may be provided in plurality by the number of each module space M. That is, the module space cover may be positioned on the upper portions of each battery module seated in each module space M to cover the upper portion of each battery module. Here, the module space cover may include a fire-resistant, heat-resistant, and non-combustible material. For example, such material may correspond to MICA, resin, EPDM, a composite material, a metal material, and the like. In this case, as illustrated, the module space cover 30 of the present invention may have a structure in which the plurality of covers are stacked in multiple layers.

The battery pack cover 40 may be provided on the upper portions of the plurality of module space covers 30 and the upper portion of the battery pack case 20 to shield the inner space of the battery pack case 20 as a whole, and may be formed in a plate form having sufficient size to completely shield the space inside the outer frame of the battery pack case.

As described above, the upper cover covering the battery pack case 20 of the present invention may be configured in a double shielding structure that includes the plurality of module space covers 30 separated from each other for shielding each module space M and one battery pack cover 40 for shielding the inner space of the battery pack case 20 as a whole.

Furthermore, although not illustrated in the battery pack of the present invention, a heat-conducting member (for example, a thermally conductive resin layer) is further provided on the plate, and the cooling pipe for cooling the battery module may be built-in inside the plate. In this case, in the battery module 10 of the present invention, as described above, the module case does not have the lower cover, so that the lower portion of the cell assembly and the thermally conductive member may be in direct contact with each other, and heat exchange occurs directly between the cell assembly and the plate, thereby further improving the heat exchange performance.

According to the present invention, a CMU mounting part is provided on an end plate to be able to mount a CMU on the end plate, thereby easily and conveniently mounting the CMU on the battery module.

In addition, even when a CMU is configured of one component as an individual component, according to the present invention, the CMU is simply mounted on an end plate regardless of a type of CMU component to connect to a battery module, thereby greatly increasing compatibility between the battery module and the CMU component.

Furthermore, by applying such a battery module to the battery pack, it is possible to simplify the entire manufacturing process of a battery pack and increase space utilization inside the battery pack.

Although exemplary embodiments of the present invention have been described with reference to the accompanying drawings, those skilled in the art will appreciate that various modifications and alterations may be made without departing from the spirit or essential feature of the present invention. Therefore, it should be understood that the above-mentioned exemplary embodiments are exemplary in all aspects but are not limited thereto.

What is claimed is:

1. A battery pack, comprising:
a battery module including a cell assembly in which a plurality of battery cells are stacked; and
an end plate disposed on one side of the cell assembly to cover the cell assembly,
wherein the end plate includes a CMU mounting part where a CMU (cell monitoring unit) for managing the cell assembly is mounted; a plate on which the battery module is disposed;
an outer frame that is formed at a predetermined height outside the plate; and
at least one inner frame that partitions an inner space formed by the plate and the outer frame into a plurality of module spaces, wherein the inner frame is formed so that a center beam or a cross beam of the inner frame is indented inward to accommodate the CMU of the battery module,
wherein the space accommodating the CMU and the space accommodating the cell assembly are contiguous, side-by-side, spaces,
wherein the CMU includes a PCB (printed circuit board) and a PCB cover, and the CMU mounting part includes a bracket protruding from the end plate at a predetermined height and accommodating the PCB therein.

2. The battery pack of claim 1, wherein the CMU mounting part further includes at least one protrusion protruding from the end plate at a predetermined height, and the PCB has a through hole formed at a position corresponding to the protrusion and is mounted inside the bracket through coupling of the through hole and the protrusion.

3. The battery pack of claim 2, wherein the PCB is fixedly coupled to the end plate by thermally fusing the protrusion penetrating through the through hole.

4. The battery pack of claim 1, wherein the PCB is bolted to the end plate.

5. The battery pack of claim 4, wherein the CMU mounting part further includes at least one bolt fastening part formed on the end plate, and
a bolt fastening hole penetrating through the PCB is formed in the PCB at a position corresponding to the bolt fastening part.

6. The battery pack of claim 4, wherein the CMU mounting part further includes at least one hook protruding from the bracket, and
the PCB is fitted between the hook and the end plate.

7. The battery pack of claim 1, wherein the CMU mounting part further includes at least one first bolt fastening part formed on the end plate, a second bolt fastening part is provided on the PCB cover at a position corresponding to the first bolt fastening part, and the PCB cover is bolted to the end plate using the first bolt fastening part and the second bolt fastening part.

8. The battery pack of claim 1, wherein the CMU mounting part includes at least one first locking groove or a first hook formed in the bracket, a second hook or a second locking groove is formed in the PCB cover at a position corresponding to the first locking groove or the first hook, and the PCB cover is coupled to the bracket by fastening the first locking groove to the second hook, or the first hook to the second locking groove.

9. The battery pack of claim 1, further comprising:
a first side cover covering a first surface of the cell assembly;
a second side cover covering a second surface of the cell assembly;
a first sensing assembly including a first connection block provided between the first side cover and the cell assembly to electrically connect the battery cells and a first sensing member connected to the first connection block and sensing information on at least one of the battery cells; and
a second sensing assembly including a second connection block provided between the second side cover and the cell assembly to electrically connect the battery cells and a second sensing member connected to the second connection block and sensing information on at least one of the battery cells.

10. The battery pack of claim 9, wherein the first sensing assembly further includes a first sensing connector coupling to the first sensing member,
the second sensing assembly further includes a second sensing connector coupling to the second sensing member,
the CMU further includes a first PCB connector and a second PCB connector each coupled to the PCB,
the CMU and the first sensing assembly are coupled to each other by coupling the first sensing connector with the first PCB connector, and
the CMU and the second sensing assembly are coupled to each other by coupling the second sensing connector with the second PCB connector.

11. The battery pack of claim 9, wherein each of the first sensing member and the second sensing member is formed of FPCB.

12. The battery pack of claim 1, wherein the plate includes a cooling pipe, and a thermally conductive resin layer is provided on the plate, and the cell assembly of the battery module directly contact with the thermally conductive resin layer.

13. The battery pack of claim 12, further comprising:

a module space cover for shielding each of the module spaces provided on an upper portion of the battery module, and a battery pack cover for shielding the inner space provided on the upper portion of the module space cover.

* * * * *